Oct. 18, 1960 G. H. KELLER 2,956,520
CANDY CANE FORMING MACHINE
Filed May 13, 1957 6 Sheets-Sheet 2

INVENTOR
Gregory H. Keller

BY
Mason, Fenwick & Lawrence
ATTORNEYS

Oct. 18, 1960 G. H. KELLER 2,956,520
CANDY CANE FORMING MACHINE
Filed May 13, 1957 6 Sheets-Sheet 3

INVENTOR
Gregory H. Keller
BY Mason, Fenwick & Lawrence
ATTORNEYS

Oct. 18, 1960

G. H. KELLER 2,956,520

CANDY CANE FORMING MACHINE

Filed May 13, 1957

INVENTOR
*Gregory H. Keller*

BY *Mason, Fenwick & Lawrence*
ATTORNEYS

United States Patent Office 2,956,520
Patented Oct. 18, 1960

2,956,520

CANDY CANE FORMING MACHINE

Gregory H. Keller, 211 W. 19th, North Little Rock, Ark., assignor of one-half to Robert E. McCormack, Albany, Ga.

Filed May 13, 1957, Ser. No. 658,679

17 Claims. (Cl. 107—8)

This invention relates to candy making machines, and more particularly to machines for shaping candy sticks to form candy canes.

The primary object of the present invention is to provide a machine which is capable of receiving straight sticks of candy while in a semi-plastic state and, as the sticks are being transported through the machine, bending the ends of the sticks into crooks to form so-called candy canes.

A more specific purpose of the invention is to provide in a candy cane making machine means for picking up candy sticks singly from a source of supply and transferring them to means to transport them through the machine and performing the operation of bending a crook on one end of each stick as the sticks move along the machine.

Still another object is to provide such a machine wherein the bending of the stick is accomplished by a rolling action whereby complete control with little or no breakage is attained.

Other objects of the invention will become apparent from the following description of several embodiments thereof, when taken in conjunction with the drawings which accompany, and form part of, this specification.

In general, the machine includes means for taking candy sticks, in a semi-plastic state, singly from a source of supply and transferring them, while holding them against bending, to a transporting means upon which the sticks are carried past a bending station where crooks are formed at one end of the sticks by mechanism which rolls the stick ends around forms, or dies.

Referring to the drawings in detail, the various mechanisms making up the machine are mounted upon any suitable framework or supporting structure. A frame is shown having horizontal side rails 1, mounted upon legs 2 and held in spaced relation by a suitable number of cross braces 3. A shelf 4, beneath the side rails 1, forms a convenient support for a driving motor 5 and a gear reduction mechanism 6 driven from the motor by a chain drive 7. The gear reduction mechanism 6 is connected by a chain drive 8 to a main drive shaft 9, journalled in bearing plates 10 fastened to the side rails of the frame. All of the mechanism is driven from the main drive shaft 9.

The principal parts of the machine are: a source of supply 11 of straight candy sticks, a transfer means 12 to pick up sticks from the source 11 and feed them into the machine, a transporting mechanism 13 which receives the sticks from the transfer means 12 and carries them through the machine, with a part of the transporting mechanism including grippers which also form dies about which the stick ends may be bent, and bending mechanism 14 alongside the transporting mechanism to engage the stick ends and roll them about the dies.

The supply source may take any convenient form, but is shown as an inclined shelf 15 having its front edge, that is the edge adjacent the transfer means 12, notched to provide a plurality of spaced forwardly projecting teeth 16. Each tooth has an upstanding lip 17 with all of the lips being in alignment and functioning as a ledge, or retaining wall, to hold sticks of candy in position to be picked up by the transfer means 12. It will be understood that candy sticks may be delivered to the shelf 15 by a conveyor belt or other suitable means, not shown. A supply of sticks will be kept on the shelf, so that as one is removed another will roll down into position against the wall formed by the upstanding lips 17. The shelf is supported above the frame by appropriate brackets 18.

The transfer mechanism is in the form of a skeletal drum and consists of a pair of spaced disks 19, bridged by candy stick lifting and holding cradles 20 and mounted upon a shaft 21 which traverses the machine frame and is fixedly supported in blocks 22 held by frame extensions 23. Disks 19 are free to rotate on shaft 21. The drum is rotated to bring the cradles 20 successively past the shelf 15 by means of a chain drive 24, interconnecting the main drive shaft 9 and one of the disks 19.

Figure 1:
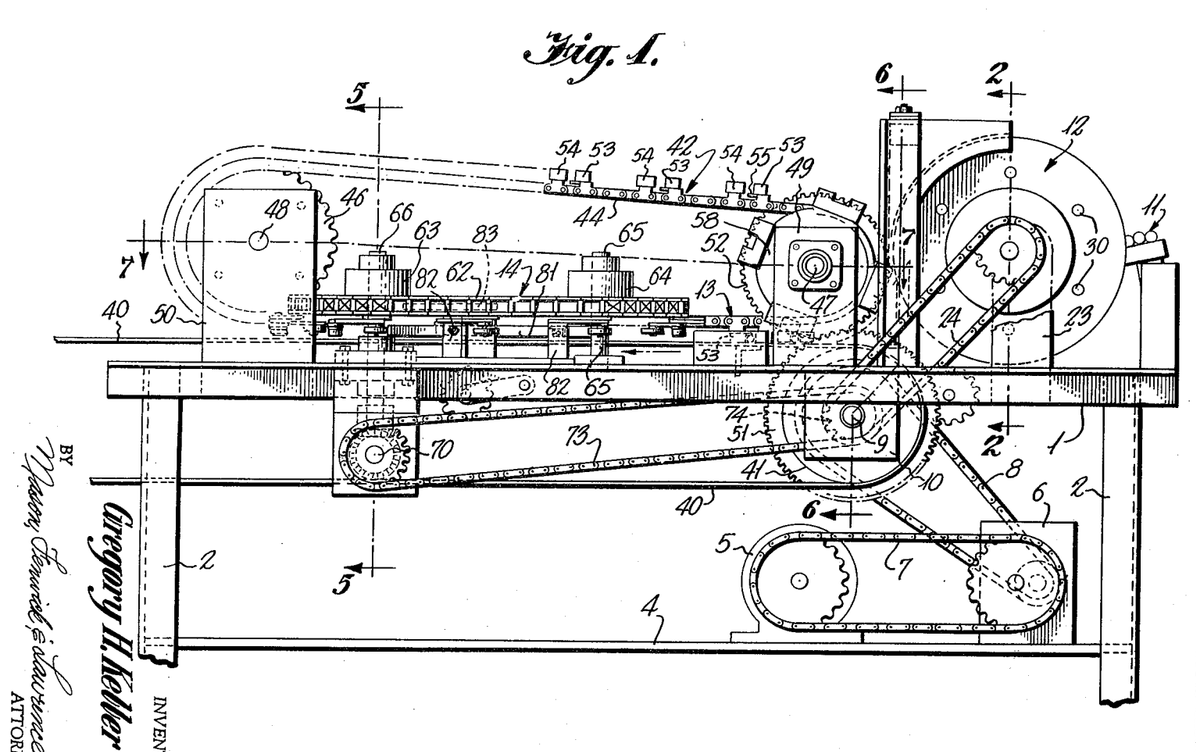
Figure 1 is a side elevational view of a candy cane making machine embodying the principles of the present invention.
Figure 2:
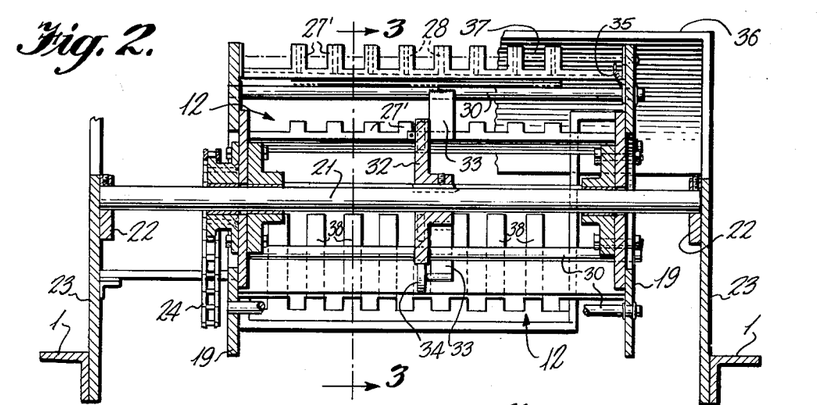
Figure 2 is a vertical section through the feed drum and adjacent mechanism, and is taken transversely of the machine on the line 2—2 of Figure 1.
Figures 3, 4:
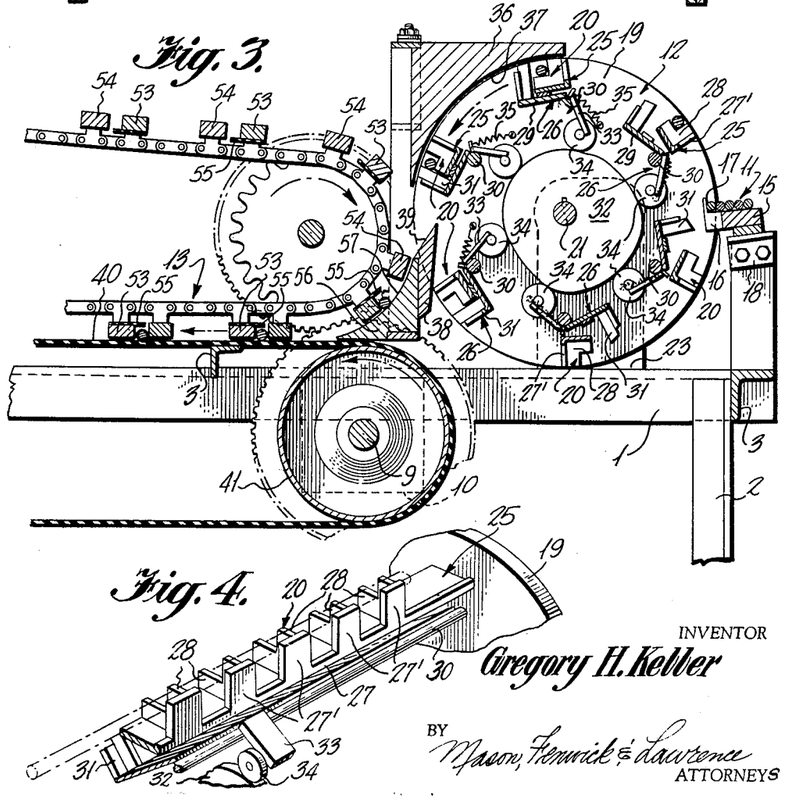
Figure 3 is a vertical section through the feed drum and adjacent parts of the stick transporting mechanism, and is taken longitudinally of the machine on the line 3—3 of Figure 2.
Figure 4 is a perspective view of a portion of one of the feed drum grippers.
Figure 5:
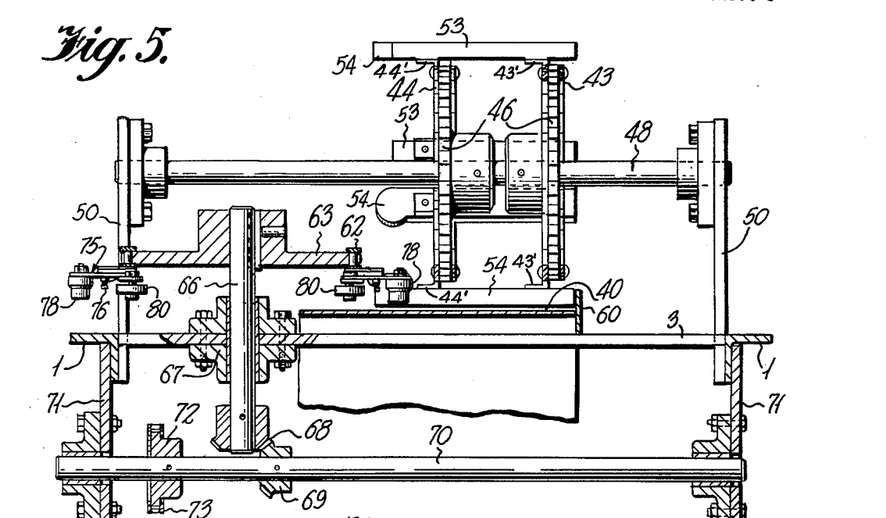
Figure 5 is a vertical transverse section through the machine taken at the crook bending station and on the line 5—5 of Figure 1.
Figure 6:
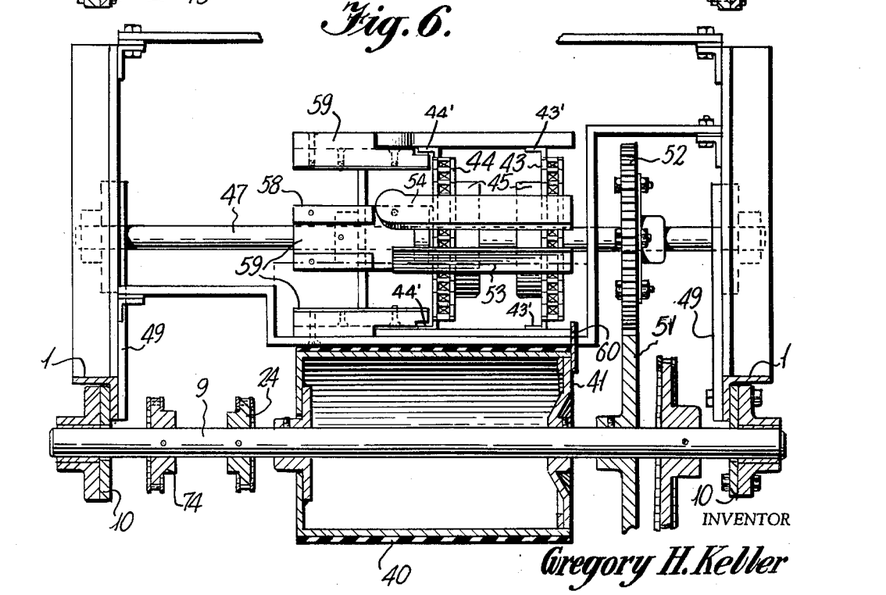
Figure 6 is a transverse section taken on the line 6—6 of Figure 1 and viewing the transporting belt and stick gripping chain and their driving connections.
Figure 7:
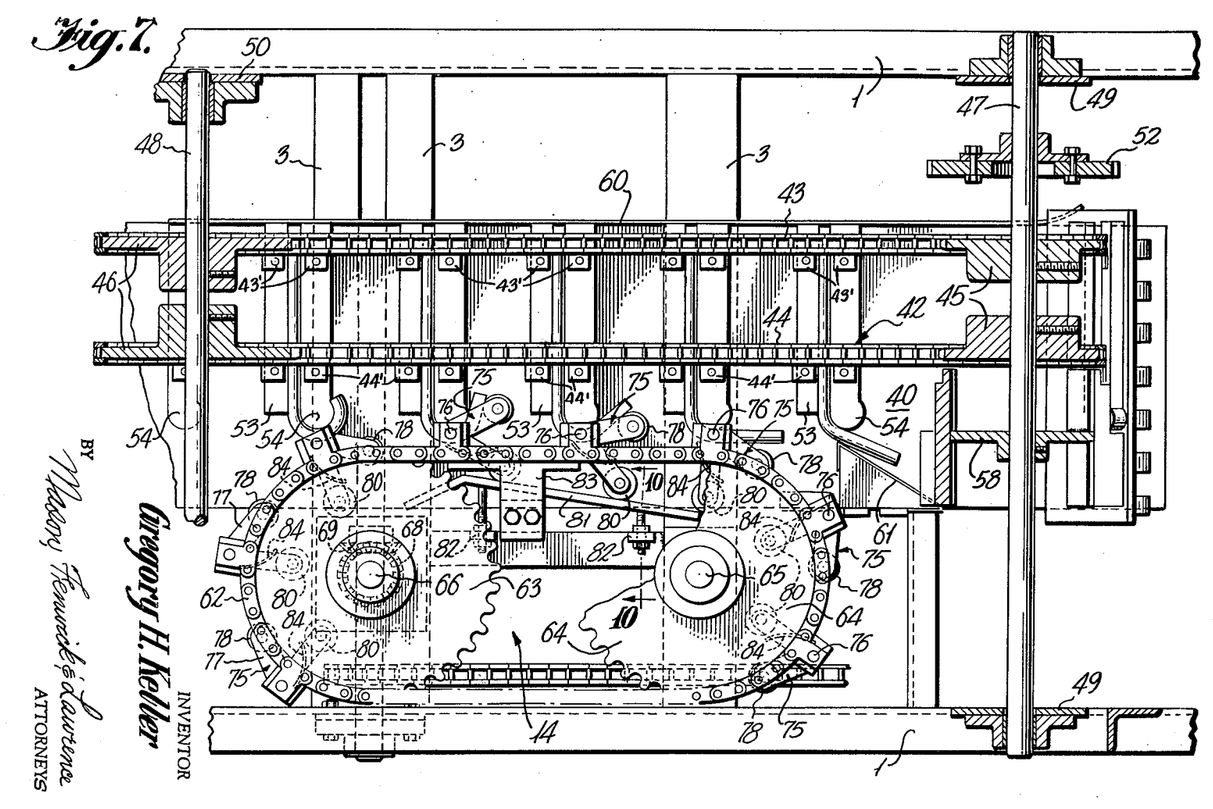
Figure 7 is a horizontal section taken on the line 7—7 of Figure 1 and illustrating in top plan view the stick bending mechanism.
Figure 8:
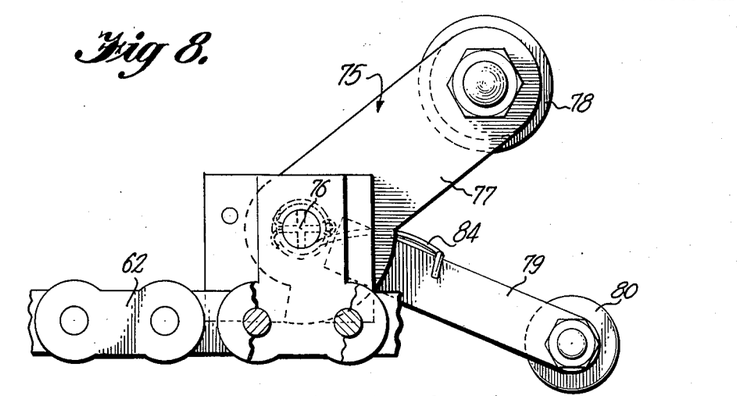
Figure 8 is an enlarged detail of a portion of the chain carrying the bending elements and one of the bending rollers and its carrying and control arms.
Figure 9:
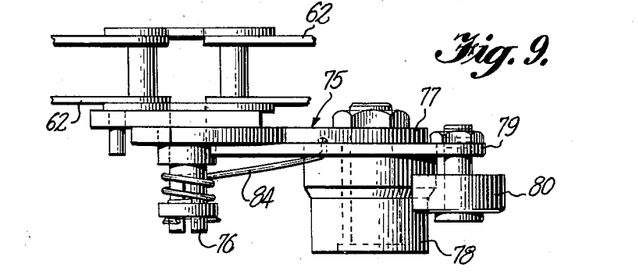
Figure 9 is a side elevation of the structure shown in Figure 8.
Figure 10:
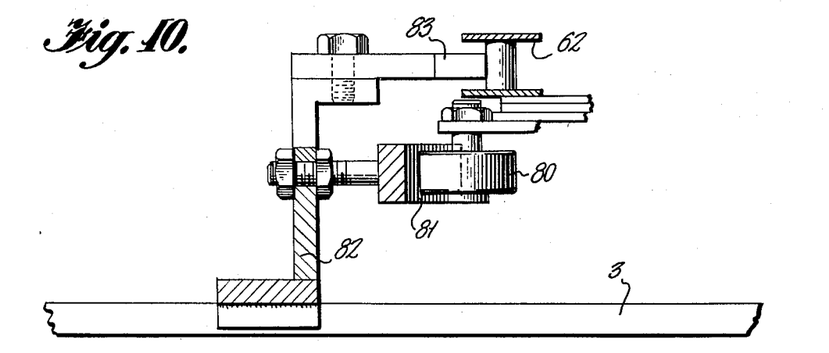
Figure 10 is a vertical transverse section taken on the line 10—10 of Figure 7, illustrating the control cam for the bending mechanism and associated structure.

Each of the stick receiving cradles 20 is composed of two parts, a fixed member 25 and a pivoted member 26 which cooperate to form a U-shaped seat, or cradle, for individual sticks of candy. The fixed member 25 consists of a bar 27, right-angular in cross-section, which extends from one side disk 19 to the other and has seated therein a plurality of stick-receiving, angular seats 28. The radial flanges of the bars 27 are notched to provide a plurality of fingers 27' positioned to pass through the spaces between the teeth 16 of the supply shelf 15 as the drum rotates. The angular seats 28 are connected to the bars 27 in alignment with the fingers 27'. The lower legs of the angular seats 28 extend in the direction of rotation of the transfer mechanism and form the bottoms of the stick-receiving cradles mentioned above. The pivoted members 26 each comprise a plate 29 which is fixed to a pivot rod 30 extending across the feed mechanism and journalled in the side disks. Plate 29 supports a plurality of upstanding fingers 31 spaced similarly to the fingers 27' of the bar 27. The pivoted members are moved out of their normal position adjacent the angular seats 28 to permit fingers 31 to avoid passing between the teeth of the supply shelf 15 and from passing under the leading candy stick on the shelf 15. After the stick has been picked up by the fingers 27', the pivot members move to close the side of the cradle to prevent the escape of the candy stick during rotation of the transfer drum. The movement of the pivoted members is controlled by means of a cam 32, which is keyed to the shaft 21 to hold it stationary. Each of the plates 29 carries a cam follower arm 33 to which is fixed a cam follower roller 34. The closure members 26 are yieldingly urged toward cradle closing position by means of springs 35 connected to pins on rods 30 and the side disks 19. The springs also serve to hold the roller 34 in contact with the cam 32. It will be clear from Figure 3 of the drawings that as the cradles approach the supply shelf 15, cam 32 causes them to open. As the drum continues to rotate, the radially extending arms of the angular seats 28 and the projecting fingers 27' will pass between the teeth of the shelf 15 and lift a stick of candy from the shelf. Continued rotation will cause the cam-following rollers to move on the cam and the springs 35 will close the cradles. This will enclose the candy stick on three sides.

As the candy cradles 20 continue around their circular path, it becomes necessary to bar movement of the candy sticks out of the fourth, or open, side of the cradles. This is accomplished by mounting a block 36 above the feed mechanism, the block having a concavely arcuate inner surface 37 concentric with the circular path of the cradles and substantially flush with the free ends of the cradle. The arcuate retaining wall 37 of the block extends from a point vertically above the center of shaft 21 to just above the horizontal on the far side of the drum from the shelf 15. Thus, as the cradles leave their highest point and begin to move downwardly, their open sides will be blocked. Block 36 may be supported upon vertical posts rising from the top rail of the frame.

At a predetermined point during the downward travel of the sticks in the cradles, it is desired to eject the sticks from the cradles to effect the transfer to the transporting mechanism. The point at which this is to be done determines the location of the bottom edge of the block 36. Although the speed of rotation of the feed means will usually cause ejection of the sticks from the cradles, ejector fins 38 are used to ensure the transfer being made in all cases, even though some of the sticks may tend to adhere to the cradles. The ejector fins are pointed at the top, having an inclined cam face 39, with the fins occupying vertical planes intermediate the planes traveled by the fingers forming the cradles. Therefore, the fins will enter between the fingers to strip the sticks from the cradles.

As the sticks are ejected from the transfer drum they are caught upon the transporting mechanism 13 to be carried through the machine and bent to shape. The transporting mechanism includes an endless conveyor belt 40 having its upper flight slightly above the horizontal plane of the side rails of the frame. The belt is trained around a pulley drum 41, mounted upon the main drive shaft 9, and extends beyond the machine to a suitable delivery point. Cooperating with the belt 40, and located directly above it, is a gripper chain 42 which consists of a pair of transversely spaced chains 43 and 44 passing around sprockets 45 and 46, mounted upon shafts 47 and 48, supported by uprights 49 and 50 from the frame. The gripper chains are driven by meshing gears 51 and 52 fixed to shafts 9 and 47, respectively. It will be noted that chains 43 and 44 are located to one side of the center of the conveyor belt 40. This permits support of the candy sticks along their full lengths upon the belt but a portion of the stick length will project beyond the gripper chain for bending, as will be described.

The gripper chains are bridged by means of gripper jaws 53 and 54, arranged in pairs and spaced along the chain length. Jaws 53 are rectangular and project slightly beyond the chain 43 to overlie a major portion of the width of the conveyor belt. Jaws 54 are longer than jaws 53 and overlie the belt a greater distance with the ends of the projecting portions being formed to the radius of the desired inside curvature of the crook for the canes so that the stick ends can be rolled about them. The jaws are rigidly mounted upon adjacent links of the carrying chains by connection to upstanding brackets 43' and 44' carried by individual chain links, and when traveling along the lower flight will have their adjacent faces spaced apart substantially the diameter of the candy sticks to be handled. As the links turn around the sprockets, the jaws assume radial positions with respect to the sprocket which causes increased separation between adjacent jaw faces. This permits ready insertion of sticks between the jaws for gripping and ready release of the sticks after formation to shape.

As the pulley for conveyor belt 40 is mounted upon the main drive shaft 9, and the transfer drum and gripper chain are mounted upon shafts 21 and 47, respectively, both of which are driven from shaft 9, the three elements can be synchronized easily for proper movement. Belt 40 and the gripper chains are driven at the same linear speed, with the bottom flight of the gripper chains being parallel to, and spaced just enough above, the top flight of the belt to permit free movement of the gripper jaws and these respective flights of the two elements moving in the same direction. The rotational speed of the transfer drum is such that a cradle is brought opposite the ejection point simultaneously with the arrival of a pair of gripping jaws at that point. As the gripper jaws will be separated at this time due to the fact that they are traveling around the sprocket, candy sticks when ejected from the cradle will be forced by the cam action of the ejector fins between a pair of jaws. Jaw 53 carries a projecting plate 55 which extends into the space between the jaws and prevents the stick from being thrown against the gripper chains.

Each pair of gripper jaws will have travelled about sprockets 45 to a substantially horizontal position when they receive a stick and the jaws are traveling downwardly separated from one another and, therefore, have no grip upon the candy stick. As the jaws continue their downward movement the stick would fall from between them if some means were not provided to bridge across the space between the jaws. To accomplish this, a second block 56 is provided and mounted in the supports which carry the first confining block 36. Block 56 has a concavely arcuate inner wall 57 concentric to the path of movement of the jaws so that the jaws pass lightly over this surface as they move around the sprockets. As the jaws reach the bottom of the sprocket and begin passage along the bottom flight of the chain, the links will come into alignment and the jaws will close to grip the candy stick between them. The stick will be resting upon the top flight of the belt and supported for its full length.

The cradles of the transfer mechanism are sufficiently long to support the candy stick throughout its full length but, as mentioned above, the jaws of the gripper chain are only long enough to support a portion of the stick length so that the portion of the stick which is to be bent into a crook extends beyond the ends of the jaws. The candy stick will be semi-plastic and will bend under its own weight if some means is not provided to support this projecting portion during its passage from the ejection point of the transfer mechanism across the block 56 and until the sticks are supported full length upon the top flight of the belt 40. To provide this support, a spider 58 is mounted on shaft 47 adjacent the outer ends of the gripper jaws 53 and 54. The spider carries a plurality of trough-like supports 59 to receive the projecting ends of the candy sticks during their downward passage over the concave face of the block 56. The trough-like supports will have the same spacing as the jaws on the gripper chains and, therefore, in effect form continuations of these jaws so that the stick will be supported along its full length.

Throughout the remainder of the passage of the candy stick through the machine it will ride upon belt 40, gripped by the gripper jaws 53 and 54 to hold it in positive transverse alignment upon the belt. Guide plate 60 is arranged along one side of the belt 40 to contact the ends of the sticks as they move onto the belt to insure precise alignment of the sticks on the belt. Due to this arrangement, each stick will project a predetermined amount beyond the ends of the gripper jaws.

As the stick is carried along by the transporting mechanism, the projecting end of the stick is brought into contact with an inclined face of a bending element 61. This bending element is supported on the frame and overhangs the top flight of the belt 40 to lie in the path of the projecting end of the candy stick. It has its inner end spaced from the adjacent end of the die forming gripper jaw 54 a distance equal to the diameter of the candy sticks. As the gripper chains move the stick along past the inclined face of the bending element, the end of the stick will contact it and be bent around the die at the end of the gripper jaw 54 to extend at right angles to the main portion of the candy stick.

The candy sticks, with one right angle bend, continue along the path of travel until contacted by the bending elements of the principal bending mechanism 14. The bending mechanism includes a chain 62 which passes around sprockets 63 and 64. The sprockets are horizontal and the chain follows a horizontal orbital path. Sprocket 64 is mounted upon a shaft 65, secured to one of the cross braces 3 of the frame, and sprocket 63 is mounted upon a shaft 66, journalled in bearings 67 mounted on a cross brace of the frame. The lower end of shaft 66 carries a bevel gear 68 which meshes with a companion bevel gear 69 on a shaft 70, which is rotatably supported in brackets 71 depending from the side rails of the frame. Shaft 70 also carries a sprocket 72 driven by chain 73 from a sprocket 74 on the main drive shaft 9. The drive will be such that chain 62 will have the same linear speed as belt 40 and the gripper chain. The inner flight of the chain 62 is mounted parallel to the path of movement of the ends of the gripper jaws. At spaced points along the chain 62, equal to the spacing between the pairs of jaws on the gripper chain, bell cranks 75 are pivotally mounted as at 76 to lie in a horizontal plane and for pivotal movement in that plane. Each of the bell cranks has an arm 77, at the end of which is mounted a bending roller 78. The other arm 79 of each bell crank carries a cam following roller 80 for contact with a cam bar 81 mounted upon adjusting screws carried by brackets 82 projecting upwardly from the frame of the machine. Cam 81 is inclined so as to converge toward the gripper chain in the direction of movement of the inner flight of the chain so that the bell cranks, in moving along that flight of the bending chain which is adjacent the gripper chain, will be caused to rock in a counterclockwise direction. This will bring the bending rollers into contact with the right angularly bent portions of the candy sticks with progressively increasing pressure to bend them smoothly about the die ends of the gripper jaws 54. This will be accomplished with a rolling motion so that the extending portions of the candy sticks will be pressed firmly and smoothly into position to form the crooks. In order to prevent chain 62 from sagging under the bending pressure applied to the candy sticks, a backing member 83 is provided, supported from the frame for contact with the chain to hold it to a straight line path of movement while the bending elements are operative. Each bell crank is provided with a spring 84 urging it toward clockwise rotation so that as soon as the cam following rollers 80 pass off the cam the bell crank will immediately move in a clockwise direction to move the bending roller out of contact with the formed cane.

After the canes have been so completed they continue movement along the machine. As the gripper jaws begin to turn about the sprockets 46, they will again assume radial positions with respect to the sprockets causing separation between their adjacent faces and a complete release of the formed cane. As the jaws move upwardly and around the sprockets, they will leave the cane lying upon the belt 40 to be carried onward to the predetermined delivery point.

Figure 11:
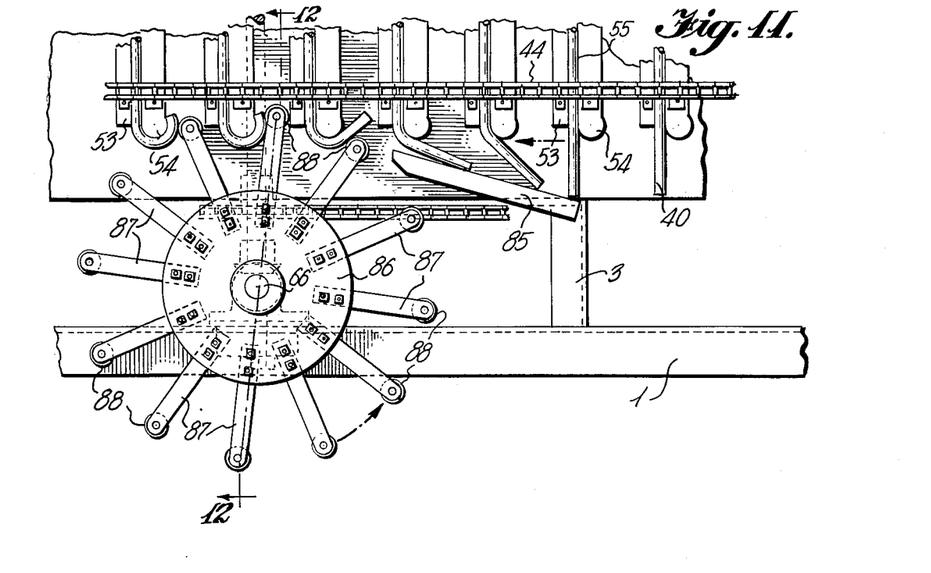
Figure 11 is a partial plan view of the machine showing modified crook-bending structure; and, Figure 12 is a vertical transverse section taken on the line 12—12 of Figure 11.
Figure 12:
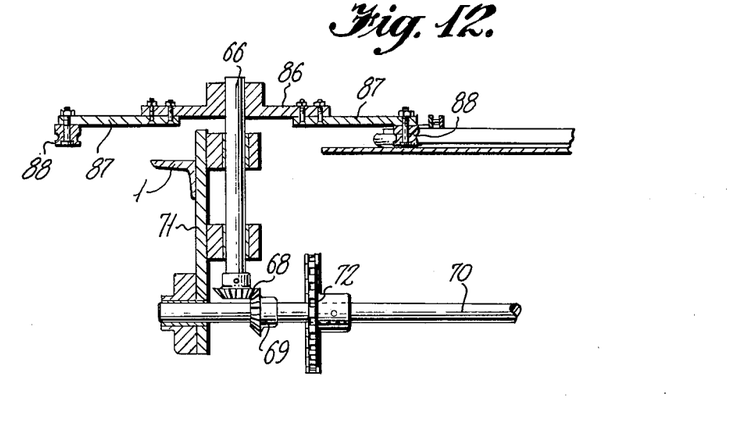

In Figures 11 and 12 a modified bending mechanism has been illustrated. It is to be understood that the machine will be the same in all respects as that previously described with the exception of the specific form of stationary bending element and movable bending elements. In other words, there will be the same source of supply of candy sticks, the same transfer mechanism, and the same transporting mechanism, including the belt 40, the gripper chains and the gripper jaws 53 and 54. All parts of the machine illustrated in Figures 11 and 12 which are duplicates of the mechanism previously described are indicated by the same reference characters.

In place of the triangular stationary bending die previously described, an inclined bar 85 is shown in the modified form. The bar is considerably longer than the operative face of the stationary element previously described and, therefore, will have a more gradual action. The chain with its bending elements has been dispensed with and in its place disk 86 is mounted at the top of the driven shaft 66 and carries a plurality of radially extending arms 87. Each arm carries a bending roller 88 at its extreme end. The timing of the gripper chain and rotating disk 86 is such that the bending rollers will move in their circular path with substantially the same linear speed as the movement of the gripper chains, so that the rollers will contact the angularly bent sticks in succession and roll them about the dies at the ends of the jaws 54 to form the cane crooks.

It will be obvious from the above that with both forms of the invention the semi-plastic candy sticks are picked up from a source of supply in continuous sequence and transferred by means of the transfer drum to the transporting mechanism. The sticks are engaged by the transporting mechanism, properly aligned transversely of that mechanism and held in aligned position while they are moved past first, a stationary bending element which turns the projecting ends of the sticks at right angles to the portions of the sticks held between the gripper jaws, and then past moving bending elements which travel with the transporting mechanism and, by means of a rolling movement, complete the bending of the stick end about the die formed on one of the gripping jaws to complete the formation of a crook. In both forms, the cane is released after formation and is carried from the machine by a conveyor belt. As the operation of the machine has been described in considerable detail in connection with the description of the respective parts of the machine, it is not believed that a restatement apart from the structure is necessary.

While two practical embodiments of the invention have been disclosed, it will be understood that the precise structural details shown and described are merely by way of illustration and the invention may take other forms within the scope of the appended claims.

What is claimed is:

1. Feed means for stick material comprising, means to support a supply of stick material to be fed including a shelf upon which sticks may lie parallel to one end of the shelf, the edge of the shelf to which the sticks are parallel being notched to provide a plurality of teeth to support sticks at spaced portions along the stick length, transfer means including an elongated cradle parallel to the notched edge of the shelf and mounted upon a rotatable drum for movement in a circular path which passes through the notched edge of the shelf, the cradle having a member of right-angular cross-section fixed with respect to the drum and having one flange radial to the path of movement of the cradle, the radial flange being notched to provide a plurality of spaced fingers to pass between the teeth of the shelf to lift sticks singly from the shelf, the cradle having a pivoted side to normally form with the fixed member a cradle of U-shape, means to move and hold the pivoted side out of its normal position during movement of the cradle toward and from the shelf so that the pivoted side will clear the shelf during passage of the fingers of the fixed member between the teeth of the shelf to pick up a candy stick therefrom and to permit the pivoted side to move back to normal position after a stick has been picked up to complete the cradle to house the stick.

2. In feed means for stick material as claimed in claim 1, means adjacent the circular path of movement of the cradle to eject sticks from the cradle.

3. A machine for bending into a crook one end of semi-plastic sticks of candy to form candy canes comprising, a frame, means on said frame to transport candy sticks singly and in continuous succession through the machine, said transporting means having grippers to engage the sticks along portions of their lengths leaving an end portion projecting beyond the grippers with the sticks transversely of the path of travel along the frame, means mounted on said frame adjacent to said transporting means and movable simultaneously with and in the direction of movement of said transporting means to engage the projecting ends of the sticks to bend them into crook-shape while the sticks are being transported through the machine, and a cam fixed to said frame in the path of travel of the projecting ends of the candy sticks to contact and bend the projecting ends of the sticks at right angles to the portion held in the grippers prior to contact of said movable bending means with said sticks.

4. In a machine for bending candy sticks to cane form as claimed in claim 3, each of said grippers comprising a pair of jaws one of which has the end beyond which the candy stick projects formed as a die about which the projecting end can be bent.

5. A machine for bending into a crook one end of semi-plastic sticks of candy to form candy canes comprising, a frame, a source of supply of straight, semi-plastic candy sticks adjacent one end of said frame, means mounted on said frame to receive candy sticks singly and in continuous succession from said source of supply and transport them through the machine, said transporting means having grippers to engage the sticks along portions of their lengths leaving end sections projecting beyond the grippers with the sticks positioned transversely to the direction of travel, means mounted on said frame adjacent to said transporting means and movable simultaneously with and in the direction of movement of said transporting means to engage the projecting ends of the sticks and bend them to crook-shape while the sticks are being transported through the machine, and a cam fixed to said frame in the path of travel of the projecting ends of the candy sticks to contact and bend the projecting ends of the sticks at right angles to the portion held in the grippers prior to contact of said movable bending means with said sticks.

6. In a machine for bending candy sticks to cane form as claimed in claim 5, each of said grippers comprising, a pair of jaws one of which has the end beyond which the candy stick projects formed as a die about which the projecting end can be bent.

7. A machine for bending into a crook one end of semi-plastic sticks of candy to form candy canes comprising, a frame, a source of supply of straight, semi-plastic candy sticks adjacent one end of said frame, means mounted on said frame to receive candy sticks singly and in continuous succession from said source of supply and transport them through the machine, said transporting means having grippers to engage the sticks along portions of their lengths leaving end sections projecting beyond the grippers with the sticks positioned transversely to the direction of travel, means mounted on said frame adjacent to said transporting means and movable simultaneously with and in the direction of movement of said transporting means to engage the projecting ends of the sticks and bend them to crook-shape while the sticks are being transported through the machine, and means to pick up sticks singly from said source of supply and transfer them to said transporting means.

8. A machine for bending into a crook one end of semi-plastic sticks of candy to form candy canes comprising, a frame, a source of supply of straight, semi-plastic candy sticks adjacent one end of said frame, means mounted on said frame to receive candy sticks singly and in continuous succession from said source of supply and transport them through the machine, said transporting means having grippers to engage the sticks along portions of their lengths leaving end sections projecting beyond the grippers with the sticks positioned transversely to the direction of travel, means mounted on said frame adjacent to said transporting means and movable simultaneously with and in the direction of movement of said transporting means to engage the projecting ends of the sticks and bend them to crook-shape while the sticks are being transported through the machine, and means to pick up sticks singly from said source of supply and transfer them to a point adjacent said transporting means, and means to eject the sticks from said transfer means onto said transporting means.

9. A machine for bending into a crook one end of semi-plastic sticks of candy to form candy canes comprising, a frame, an endless travelling chain supported from the frame and extending longitudinally thereof, pairs of gripper jaws at spaced positions along said chain with gripping faces of adjacent jaws of a pair extending transversely of the chain to receive and hold candy sticks transversely of the chain with portions of one end of the sticks projecting beyond the adjacent ends of the gripper jaws, means supported on said frame movable in a horizontal plane which includes the path of movement of the sticks in the gripper jaws and in the direction of movement of the gripper jaws to contact the projecting ends of the sticks and bend them to crook shape.

10. In a machine for bending candy sticks to cane form as claimed in claim 9, an endless belt having a flight immediately below the path of movement of the candy sticks in said gripper jaws and moving at the speed of the gripper jaws and of a width to underlie the full length of said sticks to form a moving supporting platform for candy sticks in the gripper jaws.

11. In a machine for bending candy sticks to cane form as claimed in claim 9, said movable bending means comprising a horizontal chain, bending roller elements pivotally mounted on said horizontal chain, and a cam engageable by said roller elements to move said elements toward said gripper jaws.

12. In a machine for bending candy sticks to cane form as claimed in claim 9, said movable bending means comprising, a spider including a plurality of arms having rollers at their ends.

13. In a machine for bending candy sticks to cane form as claimed in claim 9, a source of supply of candy sticks, means to pick up sticks singly and sequentially from the source of supply and transfer them to a point adjacent the path of travel of said gripper jaws, and means to eject sticks from said transfer means and into said gripper jaws.

14. A machine for bending into a crook one end of semi-plastic sticks of candy to form candy canes comprising, a frame, an endless belt having an upper flight extending longitudinally of the frame and in a horizontal plane, said belt being at least as wide as the length of the candy sticks to be bent, an endless chain supported from the frame and extending longitudinally thereof, said chain having a bottom flight parallel to and spaced above the top flight of the belt, means to drive the belt and chain at the same linear speed with the top flight of the belt and the bottom flight of the chain moving in the same direction, pairs of gripper jaws fixed to said chain at spaced intervals therealong with gripping faces of adjacent jaws of a pair extending transversely of the chain to receive and hold candy sticks transversely of the chain and belt, said jaws being shorter than the width of said belt and positioned to overlie one side of the belt whereby said jaws may grip a portion of the lengths of candy sticks leaving a portion projecting beyond one end thereof with the entire stick length supported upon said belt, the trailing jaw of each pair having its end beyond which the stick projects formed as a curved die, means mounted on said frame and overlying a portion of said belt in the path of movement of the projecting ends of sticks in the gripper jaws to contact the sticks and bend the projecting ends of the sticks at right angles to the portions between the gripper jaws and around the curved dies, and means movable in a horizontal plane which includes the path of movement of the projecting stick ends and in the direction of movement of the adjacent flights of the belt and chain to contact the angularly bent portions of the sticks and completely bend them about the curved dies.

15. In a machine for bending candy sticks to cane form as claimed in claim 14, a source of supply of candy sticks, means to pick sticks singly and sequentially from said source of supply and transfer them to a point adjacent the path of movement of said gripper jaws, and means to eject sticks from said transfer means at said point adjacent the gripper jaws and insert them between said gripper jaws.

16. In a machine for bending candy sticks to cane form as claimed in claim 14, said movable bending means comprising, a chain having a flight parallel to the path of movement of the gripper jaws, a plurality of bell cranks pivotally mounted on said bending chain having stick-contacting rollers on one arm thereof, and a cam engageable by the other arms of the bell-cranks to rock the rollers into stick engaging position.

17. In a machine for bending candy sticks to cane form as claimed in claim 14, said movable bending means comprising, a spider having horizontally projecting arms each of which carries as stick-contacting roller to engage and bend the sticks about the dies.

References Cited in the file of this patent

UNITED STATES PATENTS

| | | |
|---|---|---|
| 1,018,398 | Nishida | Feb. 20, 1912 |
| 1,836,349 | Westerfield | Dec. 15, 1931 |
| 1,890,740 | Marasso | Dec. 13, 1932 |
| 2,224,400 | Krout | Dec. 10, 1940 |
| 2,272,105 | Anastor | Feb. 3, 1942 |
| 2,827,862 | Genich | Mar. 25, 1958 |